United States Patent [19]

Kavieff

[11] Patent Number: 4,979,863
[45] Date of Patent: Dec. 25, 1990

[54] APPARATUS FOR HANDLING A GROUP OF UNIT LOADS

[76] Inventor: Shelden M. Kavieff, 28301 Harwich Dr., Farmington Hills, Mich. 48018

[21] Appl. No.: 295,271

[22] Filed: Jan. 10, 1989

[51] Int. Cl.$^5$ .............................................. B65F 9/00
[52] U.S. Cl. .................................... 414/392; 414/398; 198/774.1
[58] Field of Search .............................. 414/389–393, 414/399, 344, 347, 572, 398, 525.1; 198/774

[56] References Cited

U.S. PATENT DOCUMENTS

| | | | |
|---|---|---|---|
| 3,003,615 | 2/1959 | Ruppe | 198/774 |
| 3,437,219 | 4/1969 | Stevenson, III | 414/391 |
| 3,853,230 | 12/1974 | Shultz | 414/392 X |
| 4,071,137 | 1/1978 | Fink | 198/774 |
| 4,187,942 | 2/1980 | Ward | 198/774 X |
| 4,684,311 | 8/1987 | Wright et al. | 198/774 X |

FOREIGN PATENT DOCUMENTS 2041321 9/1980 United Kingdom ............. 414/525.1

Primary Examiner—Joseph E. Valenza
Assistant Examiner—Keith L. Dixon
Attorney, Agent, or Firm—Joseph W. Farley

[57] ABSTRACT

Apparatus for transferring a group of unit loads between a shipping dock and a vehicle bed comprises a transfer beam assembly which has a base equipped with wheels engageable with the surfaces of the shipping dock and vehicle bed, has a length greater than that of the vehicle bed, and is movable lengthwise by a reversible drive unit installed on the shipping dock, the movement being defined by guide rails on the shipping dock. Load engaging members mounted on the base of the assembly are vertically movable by inflatable tubes between a raised, load supporting position and a lowered load clearing position. Individual load units are assembled into a load unit group for transfer to a vehicle, or disassembled from a load unit group transferred from a vehicle, by raising and lowering movements of the load engaging members, and by indexing movement of the transfer beam assembly between a normal position and a pickup station adjacent the end of the assembly remote from the vehicle receiving edge of the shipping dock.

10 Claims, 6 Drawing Sheets

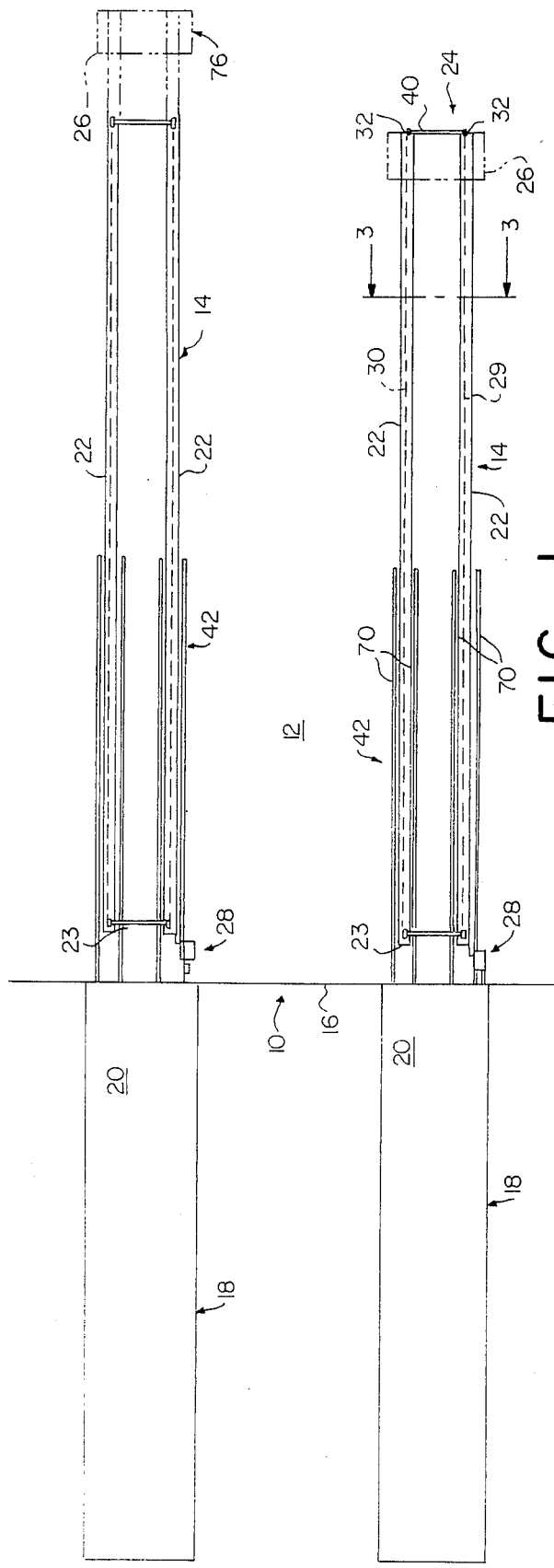

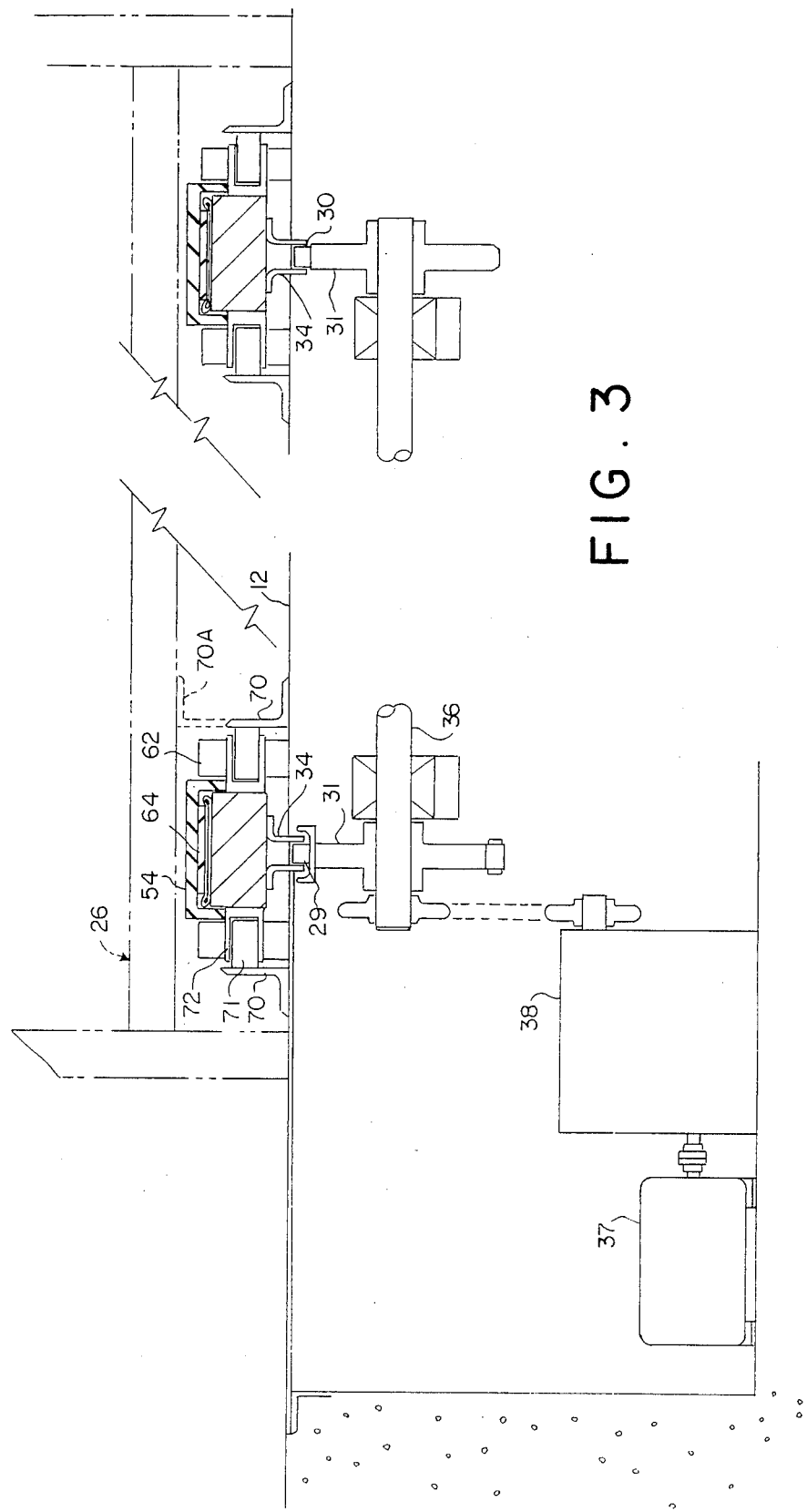

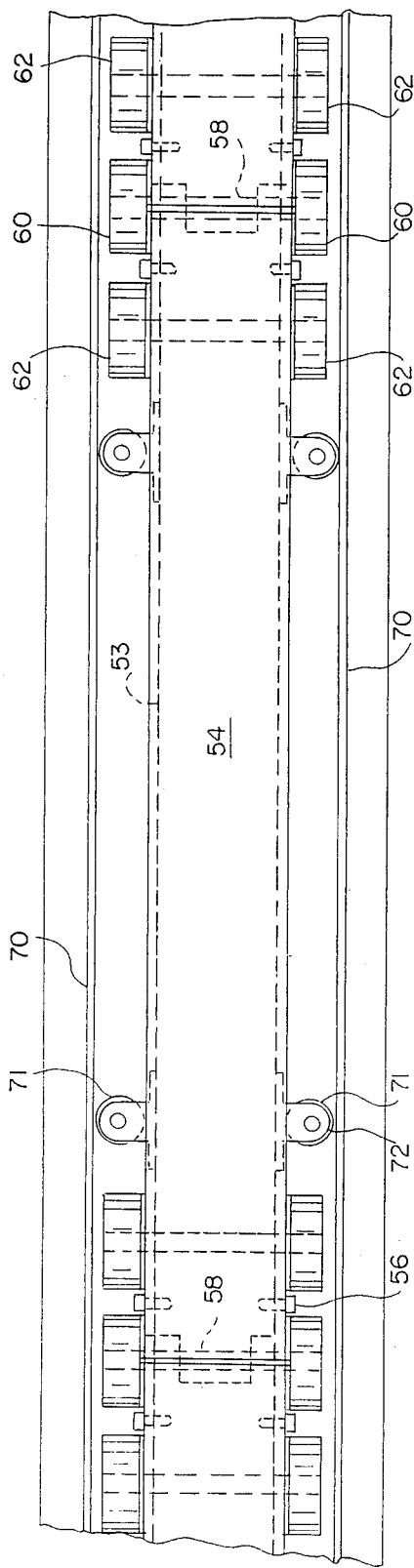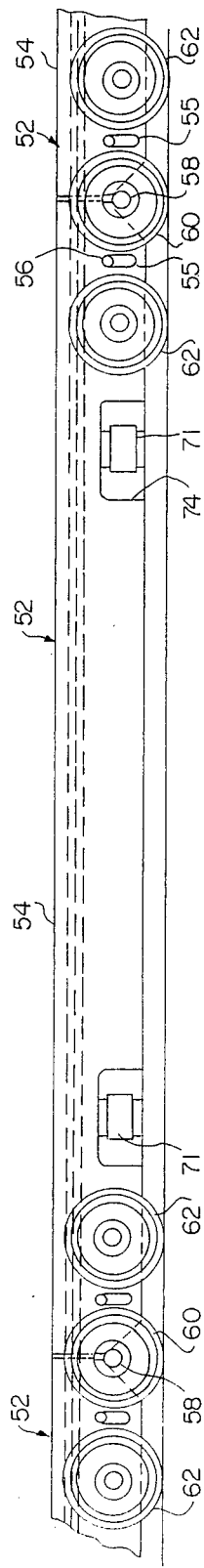
FIG. 4
FIG. 5

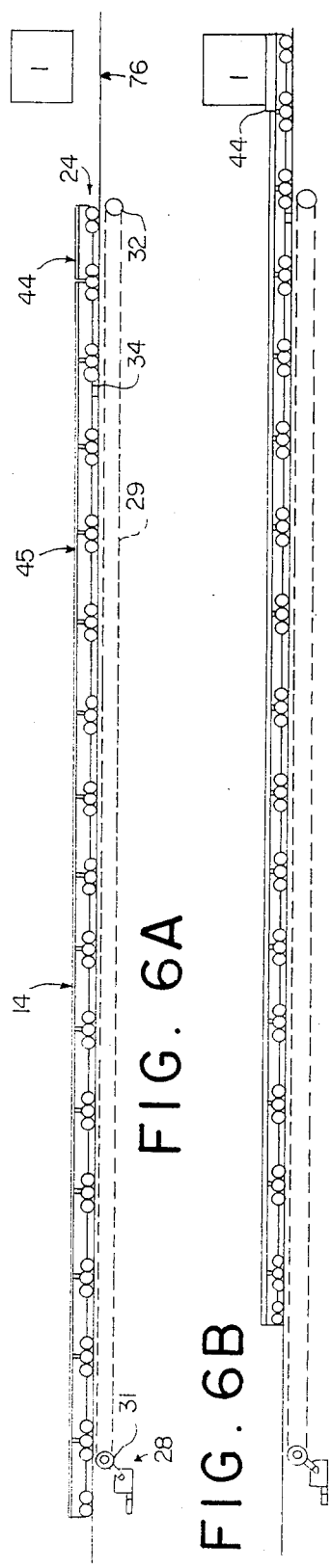
FIG. 6A
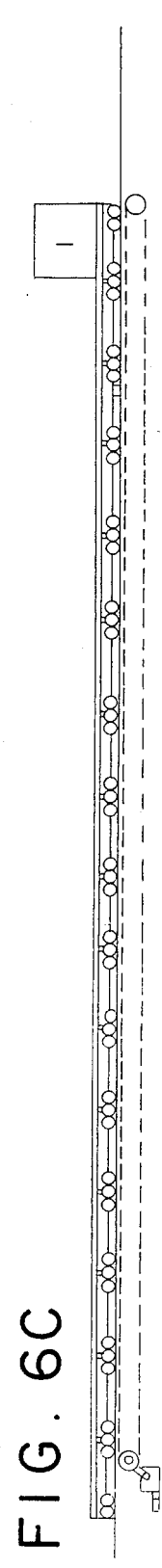
FIG. 6B
FIG. 6C
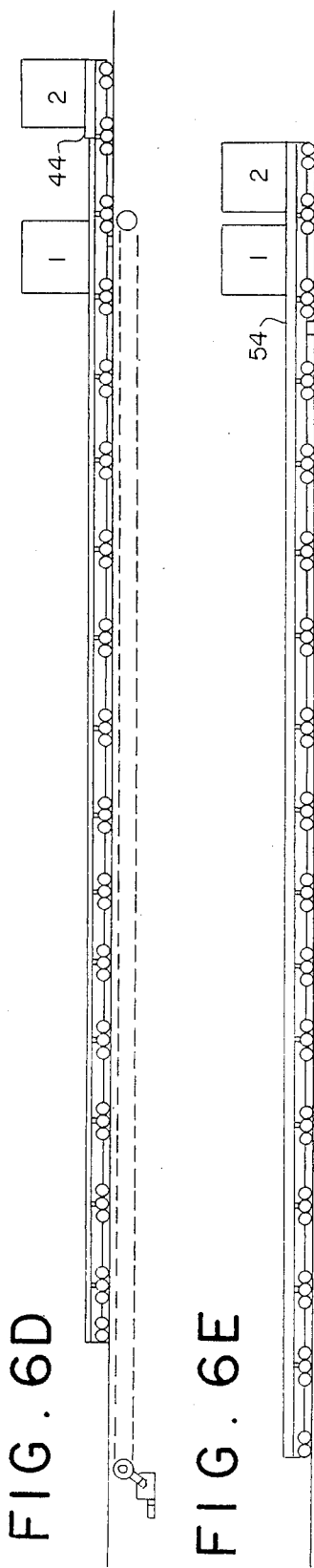
FIG. 6D
FIG. 6E
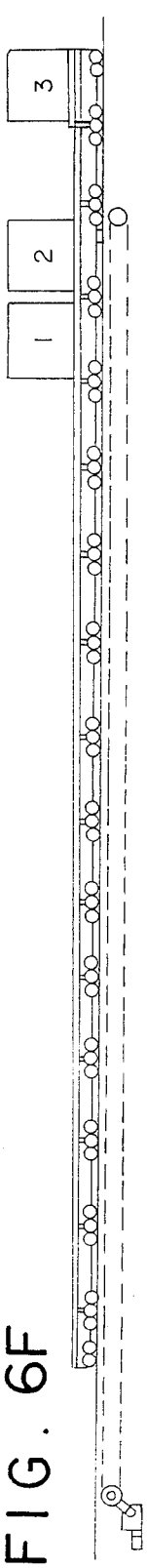
FIG. 6F

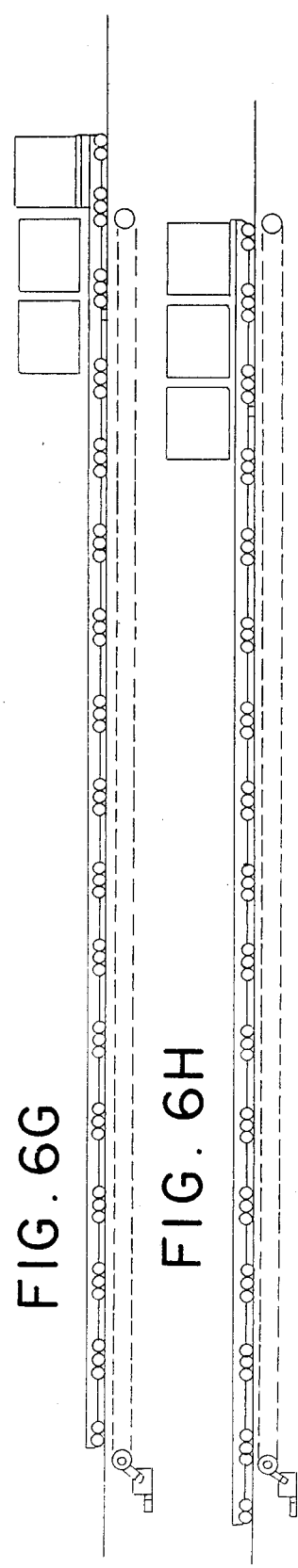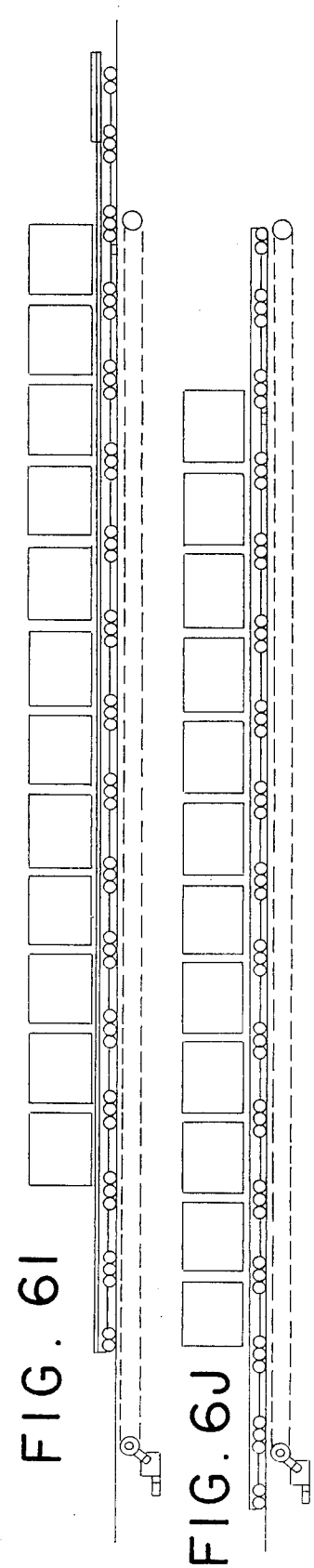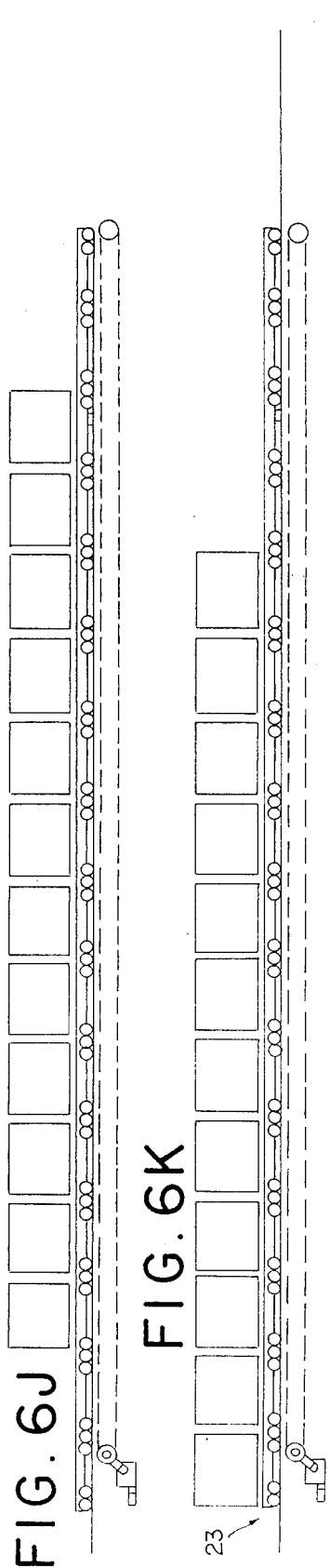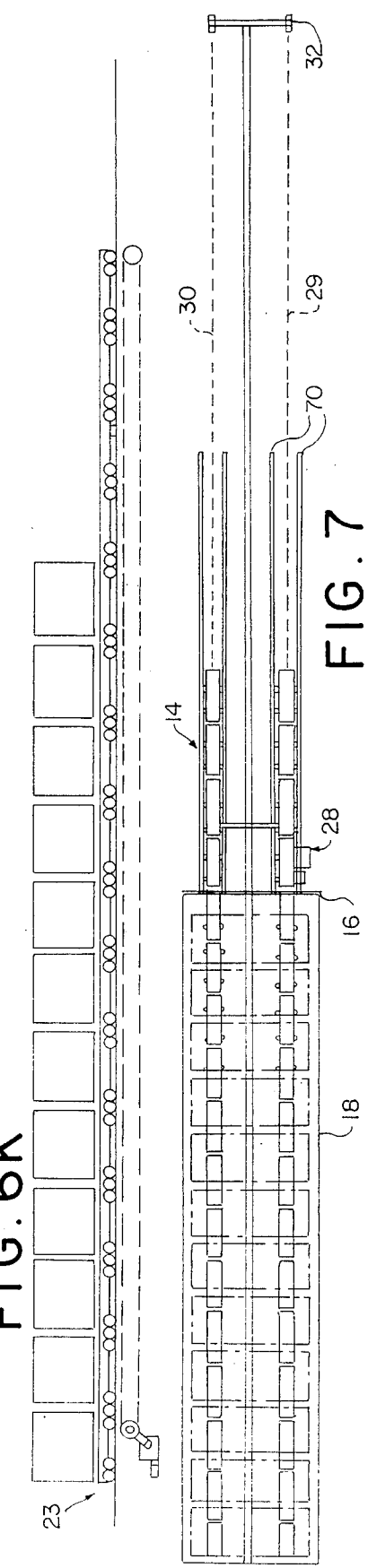
FIG. 6G  FIG. 6H  FIG. 6I  FIG. 6J  FIG. 6K  FIG. 7

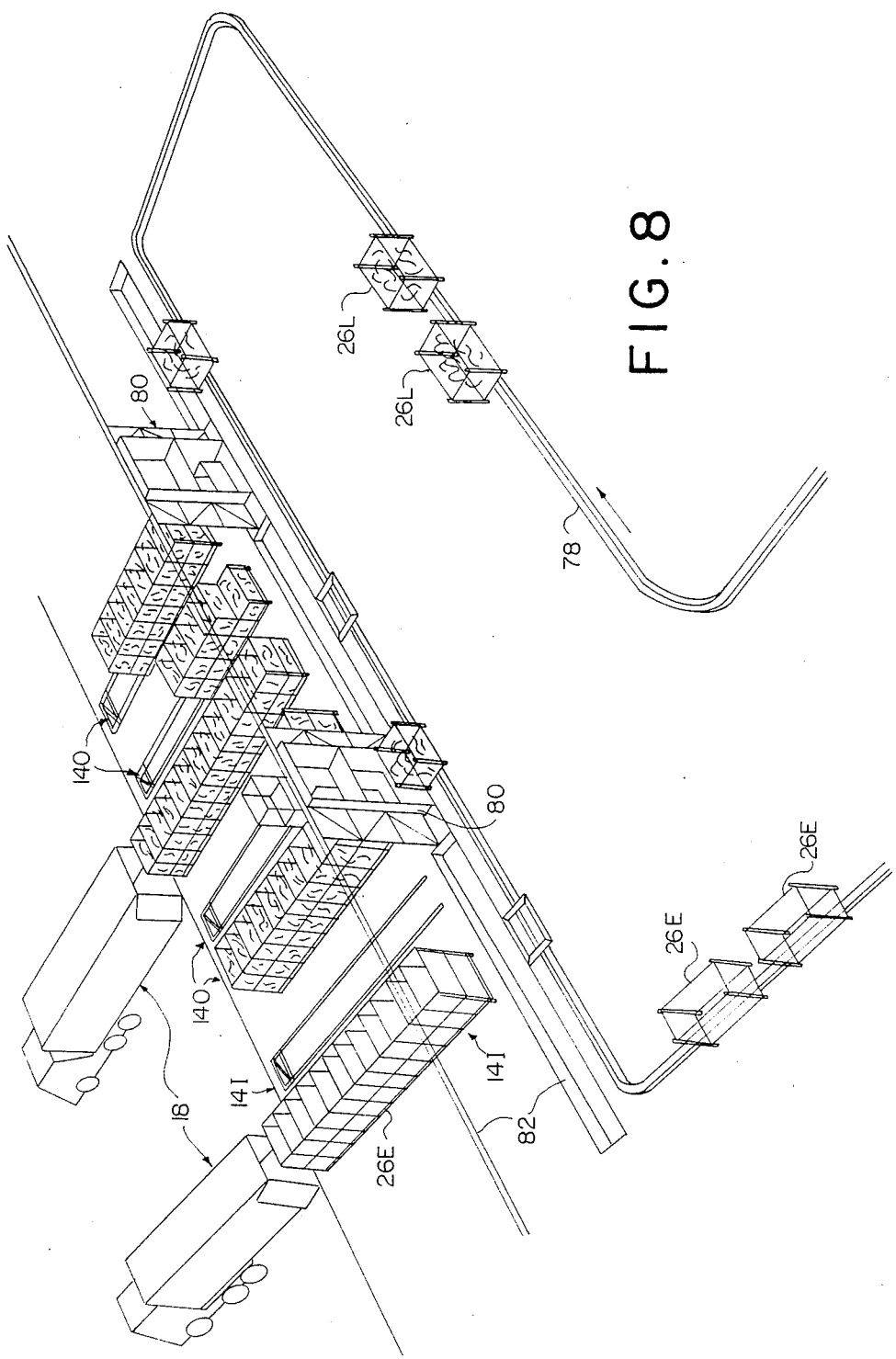

APPARATUS FOR HANDLING A GROUP OF UNIT LOADS

SUMMARY OF THE INVENTION

This invention relates to improvements in apparatus for handling a plurality of unit loads in a group and particularly for transferring such a group between a loading dock and a vehicle having a load carrying bed positioned adjacent to the loading dock The apparatus of the invention is also adapted to assemble on the loading dock a plurality of unit loads into a group and transfer the assembled group onto an empty vehicle; and conversely, to transfer a unit load group from a loaded vehicle to a loading dock and disassemble the group into individual load units.

In the automotive industry, for example, specialized satellite plants produce various components, such as engines, transmissions and stampings, which are placed in shipping racks, each shipping rack constituting a load unit to be transported by truck to a particular assembly plant. Load units bound for the same destination are segregated on the loading dock of the satellite plant and loaded into an empty truck for transportation to the assembly plant. On arrival, the truck is unloaded and reloaded with empty shipping racks or load units to be returned to the same satellite plant, unloaded from the truck and refilled with components. Conventionally, the handling of empty and filled load units on the loading docks of the manufacturing and assembly plants is done by manually operated fork trucks—a relatively cost intensive operation from the standpoints of labor, equipment and incidence.

Prior solutions to this handling problem have been proposed as exemplified by U.S. Pat. No. 3,437,219 to C. H. Stevenson III, U.S. Pat. No. 3,952,887 to D. E. Lutz, U.S. Pat. No. 3,958,701 to S. Yatagai al. and U.S. Pat. No. 4,735,305 to D. E. Lutz et al.. While these prior solutions are directed to apparatus adapted to move a group of load units to or from a vehicle by employing a plurality of elements which can be positioned beneath the load units, raised, and moved horizontally, they have one or more of the following disadvantages:

1. Guides for the elements are required to be provided on each vehicle, thereby adding to the cost and to the difficulty of properly aligning the vehicle with the apparatus.
2. If the apparatus breaks down, access to any load units on it becomes difficult because the load units cannot be reached by a fork truck.
3. A fork truck or some comparable piece of equipment is required to place load units on the apparatus with the consequent likelihood of damage thereto.

The present invention overcomes these disadvantages and provides a load handling apparatus which can not only transfer a group of load units between a loading dock and the load carrying bed of a vehicle, but which can also assemble a plurality of load units into a group for such a transfer to a vehicle, or disassemble a group transferred from a vehicle into individual load units.

The load handling apparatus of the invention comprises at least one transfer beam assembly mounted on the surface of a loading dock and extending perpendicular to a vehicle receiving edge thereof, the transfer beam assembly having an unloading end facing that edge, an opposite loading end and a length in excess of the length of the load carrying bed of the vehicle. The transfer beam assembly has a load transfer section which is located at the loading end, is adapted to support one load unit, and is connected in end-to-end relation to a load conveying section adapted to support a load unit group and having a length greater than that of such group. Each of these sections includes a base member, and a load engaging member mounted on the base member for limited vertical movement between a raised, load supporting position and a lowered, load clearing position. Means, such as an inflatable tube interposed between the base and load engaging members of each section, enable the load engaging members to be individually and selectively moved between their raised and lowered positions. Wheels mounted on the base member of each section support the transfer beam assembly for lengthwise movements on the surfaces of the loading dock and load carrying bed of a vehicle. A reversible drive means mounted on the loading dock and connected to the transfer beam assembly is adapted to move the transfer beam assembly on indexing increments between a normal position and a pickup position in which the load transfer section is located beneath a load unit at a pickup station adjacent to the loading end of the assembly. In response to such indexing movements and to selective raising and lowering movements of the load engaging members, successive load units are advanced from the pickup station and assembled into a load unit group arranged from the unloading end of the transfer beam assembly along a portion of the load conveying section thereof. The reversible drive means is also adapted to move the transfer beam assembly in a conveying cycle such that the portion on which the load unit group is arranged is extended onto the load carrying bed of a vehicle and returned to the loading dock surface, thereby transferring the group to the vehicle in response to raising and lowering movements of the load engaging member of the load conveying section. These movements of the transfer beam assembly are defined by guide means including at least one guide rail fixed to the loading dock surface and engageable by guide rollers carried by the base members of the transfer beam assembly. The guide rail extends from adjacent to the vehicle receiving edge of the loading dock lengthwise of the transfer beam assembly toward the loading end thereof only a distance required to define the lengthwise movements of the assembly which is sufficiently longer than the length of the vehicle bed so that no guide structure need be provided thereon.

A transfer beam of the invention can comprise a pair of the assemblies described above arranged parallel to each other at a transverse spacing such that a load unit is engageable by the load engaging members thereof. The pair of assemblies is movable as a unit by the reversible drive means and their transverse spacing provides access to load units by a fork truck driven between the pair of assemblies in case of failure of the apparatus.

Preferably the load conveying section of the transfer beam assembly is composed of a plurality of segments arranged in end-to-end relation, each segment having a base member portion and a load engaging member portion. A pivot connects the base member portion of one segment to the base member portion of the next segment and forms a horizontal transverse axle on which a first pair of supporting wheels is mounted. A second pair of supporting wheels is mounted adjacent to each end of each base portion segment thereby providing a series of sets of wheels at spaced intervals along the transfer beam assembly, each wheel set consisting a first pair of supporting wheels positioned intermediate two second pairs of supporting wheels.

Other features and advantages of the invention will from the description to follow of the embodiments thereof in the accompanying drawings.

DESCRIPTION OF THE DRAWINGS

FIG. 1 is a plan view schematically illustrating two vehicles at a loading dock equipped with two sets of load handling units the invention;

FIG. 2 is an exploded isometric view schematically illustrating the loading end portion of one of the load transfer beam assemblies of the invention;

FIG. 3 is a transverse sectional elevation of one of the load handling units, taken as indicated by the line 3—3 of FIG. 1; FIG. 3A shows the load supporting position;

FIG. 4 is a plan view showing an intermediate portion of the load transfer beam assembly of FIG. 2;

FIG. 5 is a side elevation of FIG. 4;

FIGS. 6A through 6K are schematic side elevations illustrating the sequence of assemblying a group of unit loads for transfer to a vehicle;

FIG. 7 is a plan view showing the group of unit loads transferred to a vehicle; and FIG. 8 is a perspective view illustrating a representative application of the invention for the handling of outbound load units and inbound empty load unit containers.

DETAILED DESCRIPTION

FIG. 1 shows a portion of a loading or shipping dock 10 having a surface 12 on which two load handling units 14 of the invention are mounted, the loading dock 10 including a vehicle receiving edge 16 at which two vehicles 18, such as highway trailers, are positioned, each vehicle having a load carrying bed 20 aligned longitudinally with one of the units 14 and positioned at substantially the level of the surface 12 in the conventional manner.

Each of the load handling units 14 consists of a pair of transfer beam assemblies 22 that extend perpendicular to the edge 16, each transfer beam assembly having what will be termed an unloading end 23 facing the edge 16, an opposite loading end 24, and a length in excess of the length of the vehicle bed 20. The transfer beam assemblies of each unit 14 are arranged parallel to each other and are spaced apart transversely so that a load unit, such as a shipping rack 26, can span the pair of assemblies 22 as indicated in broken line in FIG. 3; and, so that an aisle is provided for access to load units 26 in the event of a breakdown.

A reversible drive means 28 is mounted on the loading dock 10 for each of the units 14. Each such drive means 28, as shown in FIGS. 1 and 3, comprises a pair of endless chains 29 and 30 mounted below the loading dock surface, each chain extending in lengthwise alignment with one transfer beam assembly 22, being trained about a drive sprocket 31 and an idler sprocket 32, and being attached to its respective transfer beam assembly 22 by suitable connecting means 34 located toward the loading end 24 of the assembly 22. The drive sprockets 31 are connected to each other by a common drive shaft 36 which is operably coupled to a drive unit consisting of a motor 37 and a reducer 38. The idler sprockets 32 are also connected by a common idler shaft 40. Movements of the transfer beam assemblies 22 are defined by suitable guide means 42 mounted on the loading dock surface 12.

Further details of the construction of each transfer beam assembly 22 and the guide means 42 are shown in FIGS. 2-5. Referring first to FIG. 2, the transfer beam assembly 22 comprises a load transfer section 44 located at the loading end 24 of the assembly 22 and connected in end-to-end relation to a load conveying section 45 extending to the unloading end 23 of the assembly 22. The load transfer section 44 is adapted to support one load unit 26, while the load conveying section 45 is adapted to support a group, formed by a desired number of load units, and has a length in excess of the length of such group.

The load transfer section 44 includes a base member 46, an inverted channel section load engaging member 48 mounted on the base member 46 for limited vertical movement, and an inflatable tube 50 interposed between the members 46 and 48, as shown in FIG. 2. The load conveying section 45, in general, includes similar components, but in the construction illustrated the section 45 is composed of a plurality of segments 52 arranged in end-to-end relation and pivotally interconnected for relative movement on a transverse horizontal axis, the arrangement of successive segments 52 being shown in FIGS. 4 and 5. Each segment 52 includes a base member portion 53 and an inverted channel section load engaging member portion 54 mounted on the base member portion for vertical movement limited by slots 55 in the sides of the portion 54 engaging pins 56 on the sides of the portion 53. Each base member portion 53 is connected to the next successive base member portion by a pivot formed by an axle 58 which extends through interfitting tongue and groove configurations provided on the successive portions 53 and on which a first pair of supporting wheels 60 is mounted. This first pair of wheels 60 is located between two second pairs of wheels 62, one of the pairs of wheels 62 being mounted on and adjacent to the end of each of the successive base member portions 53. The same type of connection is employed between the load transfer section 44 and the first segment 52 of the load conveying section 45, as indicated in FIG. 2, which also shows an inflatable tube 64 interposed between the base and load engaging member portions 53 and 54 of the segments 52.

The inflatable tube 50 of the load transfer section 44 is provided with a connection 66 (FIG. 2) to a source of fluid pressure and a separate such connection 68 is provided on the inflatable tube 64 of the load conveying section 45. This arrangement enables the load engaging members 48 and 54 of the sections 44 and 45 to be selectively and independently moved between a raised, load supporting position shown in FIG. 3A and a lowered load clearing position shown in FIG. 3.

The guide means 42 for each transfer beam assembly 22 comprises a pair of parallel guide rails 70 fixed to the surface 12 of the loading dock and engageable by guide rollers 71 carried by brackets 72 attached to the sides of the base members 46 and 53 of the assembly 22, the guide rollers 71 projecting laterally through notches 74 in the sides of the load engaging members 48 and 54. The guide rails extend from adjacent to the vehicle receiving edge 16 of the loading dock lengthwise of the assembly 22 only a distance sufficient to define the movements thereof. Since the length of the assembly 22 is greater than the length of the vehicle bed 20 it is not necessary to install guide rails thereon. However, if the unit loads being handled are pallets nor having the supporting legs of the shipping rack shown in FIG. 3, modified guide rails would be employed as indicated by the channel section guide and load supporting rail 70A in that view. Corresponding load supporting rails would then have to be mounted on the bed of each vehicle, but these vehicle mounted rails would not be required to perform a guiding function. They would preferably be mounted at a different transverse spacing so their alignment with the rails 70A would not be necessary.

A typical operating sequence of one of the load handling transfer beam units 14 is illustrated in FIGS. 6 and 7. In FIG. 6A a transfer beam unit 14 is shown in a normal position, and a load unit 1 is shown at a pickup station 76 adjacent to the loading end 24 of the transfer beam unit and spaced longitudinally therefrom a distance such as to minimize the possibility of interference with a fork truck or other device employed to deliver load units to the pickup station. In response to operation of the drive means 28 and to selective raising and lowering movements of the load engaging members 48 and 54 of the load transfer and conveying sections 44 and 45 by their respective inflatable tubes 50 and 64, the transfer beam unit 14 is indexed to position the load transfer section 44 under the load unit 1 at the pickup station 76, and the load engaging member 44 is raised, supporting the load unit 1 thereon, as shown in FIG. 6B.

In FIG. 6C, the transfer beam unit has been indexed back to normal position and the load engaging member 44 has been lowered, depositing the load unit 1.

In FIG. 6D, a load unit 2 which has been placed at the pickup station, has been engaged and supported on the load engaging member 44 by an indexing operation of the transfer beam unit similar to that shown in FIG. 6B and described above. During the return movement of the transfer beam unit 14 to normal position, shown in FIG. 6E, the load engaging members 54 of the load conveying section 45 are raised by the inflatable tube 64 so that when the transfer beam unit reaches normal position, the load units 1 and 2 are positioned as shown in FIG. 6F.

These indexing movements of the transfer beam unit 14 are continued, as shown in FIGS. 6G and 6H until load units successively placed at the pickup station 76 have been assembled into a group on the conveying section 45 (FIG. 6I); and further indexing movements of the transfer beam unit 14, together with raising and lowering movements of the load engaging members 54, advance the load unit group to the unloading end 23 of the transfer beam unit 14 as shown in FIGS. 6J and 6K.

In FIG. 7, a vehicle 18 has been positioned at the vehicle receiving edge 16 of the loading dock in longitudinal alignment with the transfer beam unit 14, and the drive means 28 has been operated on the first part of a group conveying cycle extending the portion of the transfer beam unit on which the load unit group has been positioned onto the bed of the vehicle and transferring the load unit group thereto in response to raising and lowering movements of the load engaging members 54. Since the length of the transfer beam unit 14 exceeds the length of the vehicle bed and the load unit group, the remaining portion of the transfer beam unit not occupied by the load unit group is engageable with the guide rails 70 on the loading dock, thereby defining the directional movements of the transfer beam unit both on to and off of the vehicle bed.

An unloading operation of the transfer beam unit 14, in which a load unit group is transferred from a vehicle bed on to the loading dock and disassembled into individual load units can readily be visualized as the reverse of the loading operation described above and illustrated in FIG. 6 and 7. The provision of the pickup station 76 adjacent to the loading end 24 of a transfer beam unit 14, enables load units to be successively deposited at the pickup station by a fork truck or other device without the possibility of interference and consequent damage to either the transfer beam unit or a load unit. This arrangement also enables the shipping and receiving of load unit groups to be automated, as schematically illustrated in FIG. 8 described below.

FIG. 8 shows the shipping and receiving area of a facility at which various types of components are produced and shipped to different destinations, or alternatively are grouped according to type prior to shipment, the components being placed in empty shipping racks 26E returned to the facility. Transfer beam units 14I are designated for receiving empty inbound racks 26E, the remaining transfer beam units 14O are each designated for staging loaded outbound racks according to type of component, or destination, or both. A suitable conveyor 78 brings loaded racks 26L to the area and takes empty racks therefrom. Located between the loading ends of the transfer beam units and the conveyor are a plurality of transfer machines 80 each movable along a track 82 so as to be positionable adjacent to the loading end of a selected transfer beam unit 14, and each adapted to move racks between the conveyor 78 and the selected unit 14. The machines 80 are similar to those used in automatic warehouse systems, having a vertically movable carriage equipped with a load handling device that is shiftable transversely to either side of the track 82 and thus adapted to place one rack on or remove one rack from the top of another, as shown.

In the operation of a facility such as shown in FIG. 8, a vehicle 18 loaded with inbound empty racks 26E is backed into alignment with one of the transfer beam units 14I which unloads these racks from the vehicle as a group. The empty vehicle 18 is then moved into alignment with one of the transfer beam units 14O which has assembled a group of loaded racks 26L, and which loads that group into the vehicle 18. The transfer beam units 14I, in conjunction with the transfer machines 80, operate to disassemble an empty rack group into individual racks placed on the conveyor 78. The transfer beam units 14O, in conjunction with the machines 80, operate to assemble groups of loaded racks according to their destination and to any other criterion desired.

I claim:

1. Apparatus for assemblying and transferring a plurality of load units in a group between a loading dock surface and a vehicle having a load carrying bed positionable adjacent to a vehicle receiving edge of the loading dock and at the level of the loading dock surface, said apparatus comprising:

at least one transfer beam assembly mounted on the loading dock surface and extending perpendicular to said vehicle receiving edge, said transfer beam assembly having an unloading end facing said vehicle receiving edge, an opposite loading end, and a length in excess of the length of said load carrying bed;

said transfer beam assembly comprising a load transfer section and a load conveying section connected in end-to-end relation, said load transfer section being located at said loading end and being adapted to support one load unit, said load conveying section being adapted to support a load unit group and having a length greater than that of a load unit group, each of said sections including a base member, a load engaging member mounted on the base member for vertical movement relative thereto between a raised, load supporting position and a lowered, load clearing position, means for individually and selectively moving the load engaging member of each of said sections between said raised and lowered positions, and wheel means on the base member of each of said sections supporting said transfer beam assembly for lengthwise movements on said loading dock surface and load carrying bed;

reversible drive means mounted on said loading dock and connected to said transfer beam assembly, said drive means being adapted to move said transfer beam assembly on indexing increment between a normal position and a pickup position in which said load transfer section is located beneath a load unit at a pickup station adjacent to said loading end whereby successive load units are advanceable from said pickup station into a load unit group extending from said unloading end of the transfer beam assembly in response to raising and lowering movements of said load engaging members, said drive means being adapted to move said transfer beam assembly on a conveying movement in which a portion of said load conveying section is extended onto and off of said load carrying bed for transferring the load unit group between said loading dock and said vehicle in response to raising and lowering movements of the load engaging member of said load conveying section; and guide means for defining the movements of the transfer beam assembly, said guide means including at least one guide rail fixed to the loading dock surface and guide rollers carried by the base members of the transfer beam assembly, said guide rail extending from adjacent to the vehicle receiving edge of the loading dock lengthwise of the transfer beam assembly and being engageable by said guide rollers.

2. Apparatus according to claim 1 further comprising a pair of said transfer beam assemblies arranged parallel to each other at a transverse spacing such that a load unit is engageable by the load engaging members thereof, said pair of transfer beam assemblies being movable in unison by said reversible drive means.

3. Apparatus according to claim 2 wherein said drive means is connected to each transfer beam assembly of said pair of transfer beam assemblies.

4. Apparatus according to claim 3 wherein said drive means comprises a pair of endless chains mounted on said loading dock below the surface thereof, each chain extending in lengthwise alignment with one transfer beam assembly of said pair of transfer beam assemblies and being trained about a drive sprocket and an idler sprocket, means connecting each chain to its respective transfer beam assembly at a location toward the loading end thereof, and a reversible drive unit operably associated with a drive shaft connecting one chain drive sprocket to the other chain drive sprocket.

5. Apparatus according to claim 2 wherein said guide means includes a pair of load supporting guide rails each engageable by the guide rollers of one transfer beam assembly of said pair of transfer beam assemblies, said load supporting guide rails having a height intermediate said raised and lowered positions of said load engaging members whereby a load unit is supportable on said load supporting guide rails in the lowered position of said load engaging members, and load supporting members corresponding in height to said load supporting guide rails are provided on the vehicle load carrying bed.

6. Apparatus according to claim 2 wherein said transverse spacing between said pair of transfer beam assemblies provides an aisle for access to any load unit thereon in the event of a breakdown of the apparatus.

7. Apparatus according to claim 1 wherein said pickup station is spaced from said loading end of the transfer beam assembly in said normal position thereof a distance such as to minimize interference with the delivery of a load unit to said pickup station.

8. Apparatus according to claim 1 wherein said load conveying section of said transfer beam assembly comprises a plurality of segments arranged in end-to-end relation, and pivot means interconnecting successive segments for relative movements on a transverse horizontal axis.

9. Apparatus according to claim 8 wherein each of said segments includes a base member portion and a load engaging member portion, said pivot means interconnecting the base member portion of one of segment to the base member portion of the next successive segment, said pivot means forming an axle, and said wheel means comprises a first pair of wheels mounted on each pivot axle and a second pair of wheels on each end of each base member portion.

10. Apparatus according to claim 9 wherein said means for individually and selectively moving the load engaging member of each of said sections between said raised and lowered positions comprises a first inflatable tube interposed between the base member and the load engaging member of said load transfer section, a second inflatable tube interposed between the base member and the load carrying member of said load conveying section, and means for individually connecting each of said first and second inflatable tubes to a source of fluid pressure.

* * * * *

UNITED STATES PATENT AND TRADEMARK OFFICE
CERTIFICATE OF CORRECTION

PATENT NO. : 4,979,863

DATED : December 25, 1990

INVENTOR(S) : Shelden M. Kavieff

It is certified that error appears in the above-identified patent and that said Letters Patent is hereby corrected as shown below:

Column 1, line 33, insert "damage" before --incidence--

Column 3, line 7, insert "appear" after --will--

Column 3, line 8 insert "shown" after --thereof--

Column 7, line 18, "increment" should read --increments--

Signed and Sealed this

Twenty-eighth Day of April, 1992

Attest:

HARRY F. MANBECK, JR.

Attesting Officer     Commissioner of Patents and Trademarks